Dec. 16, 1924.
S. A. CRONE
1,519,765
PIN OR BOLT RETAINER FOR RAILWAY BRAKE BEAM LEVERS AND CONNECTIONS
Filed July 9, 1924
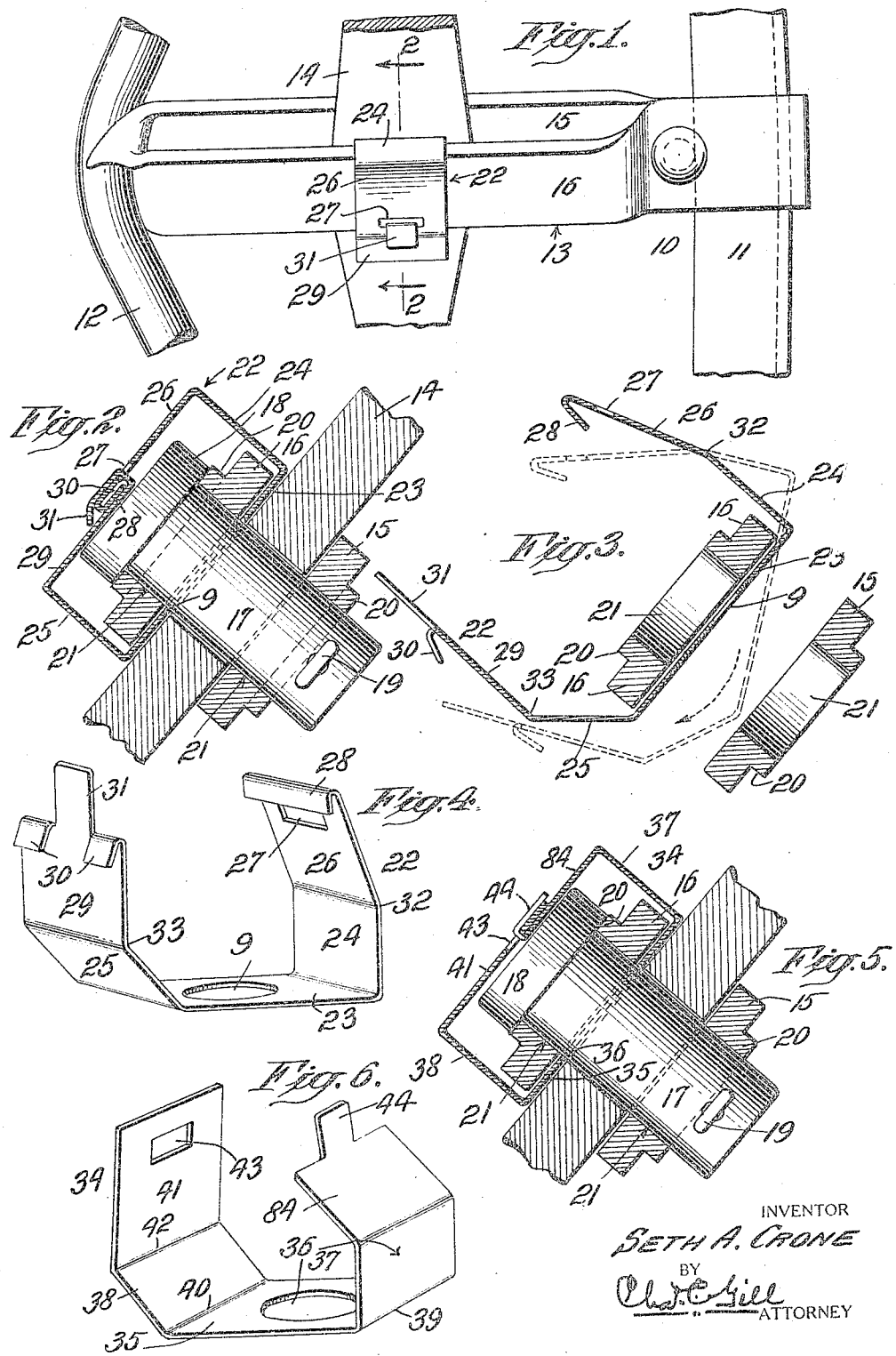
INVENTOR
SETH A. CRONE
BY
ATTORNEY Patented Dec. 16, 1924.

1,519,765

UNITED STATES PATENT OFFICE.

SETH A. CRONE, OF EAST ORANGE, NEW JERSEY.

PIN OR BOLT RETAINER FOR RAILWAY-BRAKE-BEAM LEVERS AND CONNECTIONS.

Application filed July 9, 1924. Serial No. 724,944.

*To all whom it may concern:*

Be it known that I, SETH A. CRONE, a citizen of the United States, and resident of East Orange, in the county of Essex and State of New Jersey, have invented certain new and useful Improvements in Pin or Bolt Retainers for Railway-Brake-Beam Levers and Connections, of which the following is a specification.

The invention resides in a special retaining device for preventing the loss of a pin from car-brake rigging in the event that the usual cotter key customarily employed for securing the pin, should become broken or detached from the pin.

I illustrate my invention herein as applied to a brake beam strut and to the head of the usual pin on which the brake lever is mounted between the sides of the strut. The retaining device is formed from a strip of steel having a base section interposed between one side of the strut and the brake lever and having a hole through which the brake lever pin passes, and sections extending from the ends of said base section and adapted to be folded against the side edges of the strut-side and over the head of the pin and be interlocked together, thereby forming a box-band transversely encompassing a portion of the strut-side and enclosing the head of the pin, the device thus being capable of retaining the pin in place regardless of the presence or absence of the cotter key.

The body of the retaining device is initially formed with bends defining the several sections of the device, the device then having the sections thereof standing at various angles to one another but being sufficiently open to permit of the insertion of the device between the strut-sides and the placing of the perforated middle base section thereof transversely against the inner face of the strut side the device is finally to encompass. The said bends define fold lines on which the several sections of the device are to be folded into box-band form. The sections defined by the bends or fold lines are definitely proportioned to the width and thickness of the strut side, plus the thickness of the head of the pin, and the device by reason of said bends or fold lines may be conveniently and with precision applied to operative position.

A desirable feature of my retaining device is that when in use, it cannot by any ordinary accident be torn or knocked from the head of the pin it encloses, the ends of the strip from which the device is formed being securely interlocked or fastened together.

The invention will be fully understood from the detailed description hereinafter presented, reference being had to the accompanying drawings, in which:

Fig. 1 is a top view, partly broken away, of a trussed brake-beam, to the brake lever pin of which is applied the retaining device of my invention;

Fig. 2 is a section through the same, on a larger scale, taken on the dotted line 2—2 of Fig. 1;

Fig. 3 is a sectional view through a brake-beam strut and illustrates the method of applying the retaining device of my invention thereto, the dotted lines indicating the first introductory position of the device, as when one end thereof is applied through the space between the side members of the strut, and the solid lines denoting that the middle section of the device has been placed against the inner face of one of said side members and that the brake lever and brake lever pin may then be applied to position, after which the members of my retaining device are brought together and interlocked on the head of the pin in the manner shown in Fig. 2;

Fig. 4 is a detached perspective view of the retaining device in the form in which the same will be manufactured, the device then being in condition to be properly applied along the fold lines indicated thereon to operative position;

Fig. 5 is a view corresponding with Fig. 2, but illustrating a modified construction of the retaining device, and Fig. 6 is a perspective view of the retaining device shown in Fig. 5, Fig. 6 illustrating the device in the form in which it will be manufactured for application to operative position.

In the drawings, referring to Figs. 1 to 4 inclusive, 10 designates a portion of a trussed brake beam having a compression member 11, a tension member 12, a strut 13 and the usual brake lever 14 which extends between the sides 15, 16 of the strut and is secured by the usual brake lever pin 17, said pin having a head 18 at one end and a cotter key 19 at the other end. The sides 15, 16 of the strut are formed with the usual bosses 20 around the holes 21 therein for the brake lever pin.

The retaining device of my invention is numbered, as a whole, 22 and its purpose is to prevent the loss of the pin 17 in the event that the cotter key 19 should become broken or lose its place. The retaining device 22 is itself so locked in position that it cannot be lost or accidently torn from the head 18 of the pin 17 and this adds much to the security and usefulness of the device. The retaining device 22 is formed from a strip of mild steel and is given the initial form illustrated by both dotted and solid lines in Fig. 3, said strip when in final operative position forming a box-like closed band, as shown in Figs. 1 and 2. The strip of steel from which the retaining device is formed is of suitable length and width and said device comprises a middle portion or base section 23 somewhat greater in length than the width of the side member 16 of the strut and containing a hole 9 slightly larger than the hole 21 in said member 16, two corresponding end sections 24, 25 extending at angles from the ends of the base section 23 and having a length equal to or somewhat greater than the combined thickness of the strut side 16, boss 20 thereon and head 18 of the pin, a section 26 extending from the outer end of the section 24 and formed near its outer portion with a slot 27 and an inturned bent hook 28 and a section 29 formed near its outer portion with outwardly turned bent hooks 30 and a tongue 31, said sections 26, 29 when folded toward each other on the fold lines indicated by the angles of juncture 32, 33 with the end sections 24, 25, being adapted to be hooked together and closed down against the head 18 of the pin 17, the tongue 31 during the folding of the outer sections 26, 29 toward their final position being projected through the slot 27 in the section 26 so that said tongue may be thereafter reversely bent over the outer end portion of said section 26 or to the position shown in Fig. 2. After the sections 26, 29 have been folded toward each other and hooked together and forced down against the head 18 of the pin, the hook members 28, 30 will be flattened against each other by means of a hammer or other tool, so that said sections 26, 29 will become compressed and very securely locked together against the outer end of the head 18. The tongue 31 when reversely bent over the outer end portion of the section 26 will also be flattened down by means of a hammer or other tool.

In first applying the retaining device 22 to position, the device will be inserted endwise between the sides 15, 16 of the strut, at first taking the position indicated by dotted lines in Fig. 3, and thereafter the base member or section 23 of the retaining device will be moved against the inner face of the strut side 16, the retaining device then taking the position shown by solid lines in Fig. 3. After the device has been applied to the position shown by solid lines in Fig. 3, the brake lever 14 may be introduced between the strut-sides 15, 16 and the brake lever pin inserted through said strut sides, at the holes 21 therein, and through the hole 24 in the base section 23 of the retaining device and through the usual hole in the brake lever, and thereafter the sections 26, 29 of the retaining device will, as hereinbefore described, be brought together over the head 18 of the pin and interlocked in the manner hereinbefore described and as shown in Fig. 2, the retaining device then forming a box band fully encompassing a transverse portion of the strut-side 16 and the head 18 of the pin. When the retaining device is in its final position shown in Fig. 2 it will be obvious that the pin 17 cannot escape from the strut or brake lever regardless of whether the cotter key 19 remains in place. It is also obvious that the retaining device 22 cannot by any ordinary accident be torn from its operative position against the head of the pin 17, and to accomplish this purpose is one of the objects of my invention.

In Figs. 5 and 6 I illustrate a modified construction of the retaining device as applied to the strut, brake lever and pin represented in Figs. 1 and 2. In Figs. 5 and 6 I number the retaining device as a whole 34, and this device is formed of sections initially standing at angles to each other and corresponding generally with the sections described with respect to Fig. 3. The retaining device 34 has a base section 35 containing a hole 36 through which the pin 17 passes, the end sections 37, 38 extending outwardly on fold lines 39, 40, respectively, from the ends of the base section 35, a top section 41 extending outwardly on a fold line 42 from the outer end of the end section 38, and a top section 84 extending at an angle from the upper edge of the end section 37. The section 84 is adapted to extend inwardly upon the head of the pin and the section 41 is adapted to be folded downwardly upon the section 84 and across the head of the pin, and said section 41 is formed near its outer end with a slot 43 to pass downwardly upon a tongue 44 formed on the outer edge of the aforesaid section 84. The retaining device 34 in its initial shape has the outline shown in Fig. 6, and in applying this retaining device to the strut, one end thereof is threaded through the space between the sides 15, 16 of the strut and the base section 35 of the device is brought against the inner face of the strut side 16. The brake lever may then be applied between the strut sides and the pin 17 inserted through said sides and the brake lever and through the hole 36 in the retaining device, and thereafter the sections 84, 41 of the retaining device will be folded downwardly over the head of the pin, the section 41 lapping upon the section 84 and the slot 43 of the section 41 passing downwardly over the tongue 44, after which the tongue 44 will be bent reversely over and tightly against the outer end of the section 41, thereby locking the retaining device 34 in position against the head of the pin. The retaining device 34 possesses many of the characteristics of the locking device 22, and when securely applied to position will effectually retain the pin 17 in position regardless of the presence or absence of the cotter key 19.

A distinguishing characteristic of my invention is that the retaining device is in the form of a box-like closed band transversely encompassing the strut side 16 and head 18 of the pin and that the outer members of the device are securely locked together so that by no ordinary accident may the retaining device be opened out or torn from position. A further characteristic of my invention resides in the fact that the retaining device is formed in sections defined by bends or fold lines properly positioned to assure the convenient and correct application of the device to use. The device while made of mild sheet steel, as the metal is termed, is of material rigidity and the bend or fold lines being properly positioned, add very greatly to the convenient application of the device to the parts for which it is intended.

I have illustrated the retaining device as applied to the brake-lever pin 17, but I do not limit the invention to the application of the retaining device to any special pin of the car brake system, since similar pins are employed at the upper and lower ends of the live lever and at the upper and lower ends of the dead lever and elsewhere in a brake rigging system, the pins employed at the lower ends of the live and dead levers being utilized for securing the bottom connection rod, the pin at the upper end of the live lever serving to receive the brake operating rod and the pin at the upper end of the dead lever connecting said lever with the dead lever guide, or brake lever stop, according to well understood methods.

What I claim as my invention and desire to secure by Letters-Patent, is:

1. A pin or bolt retaining device of the character described for brake levers and the like comprising two parts having holes in register and a headed pin inserted through said holes for connecting said parts in free face-to-face relation, in combination, said retaining device for said pin being of sheet metal and comprising a middle or base section interposed between said parts and having a hole through which said pin passes, end sections extending outwardly from said base section and outer sections extending from said end sections and adapted to be folded toward each other over the head of said pin, said outer sections having on their free ends interlocking means for locking the device in position, and said device forming a closed box-band transversely encompassing one of said parts and enclosing the head of the pin.

2. A pin or bolt retaining device of the character described for brake levers and the like comprising two parts having holes in register and a headed pin inserted through said holes for connecting said parts in free face-to-face relation, in combination, said retaining device for said pin being of sheet metal and comprising a middle or base section interposed between said parts and having a hole through which said pin passes, end sections extending outwardly from said base section and outer sections extending from said end sections and adapted to be folded toward each other over the head of said pin, said outer sections having at their free ends a slot and tongue, respectively, to be interengaged for locking the device in position, and said device forming a closed box-band transversely encompassing one of said parts and enclosing the head of the pin.

3. A pin or bolt retaining device of the character described for brake levers and the like comprising two parts having holes in register and a headed pin inserted through said holes for connecting said parts in free face-to-face relation, in combination, said retaining device for said pin being of sheet metal and comprising a middle or base section interposed between said parts and having a hole through which said pin passes, end sections extending outwardly from said base section and outer sections extending from said end sections and adapted to be folded toward each other over the head of said pin, said outer sections having on their free ends interlocking hooks to be flattened against the head of the pin for locking the device in position, and said device forming a closed box-band transversely encompassing one of said parts and enclosing the head of the pin.

4. A pin or bolt retaining device of the character described for brake levers and the like comprising two parts having holes in register and a headed pin inserted through said holes for connecting said parts in free face-to-face relation, in combination, said retaining device for said pin being of sheet metal and comprising a middle or base section interposed between said parts and having a hole through which said pin passes, end sections extending outwardly from said base section and outer sections extending from said end sections and adapted to be folded toward each other over the head of said pin, said outer sections having on their free ends interlocking means for locking the parts of the device over the head of the pin, and said device being formed with fold lines or bends defining said sections and the proportions of the width of the part against which it is to be applied and the combined thickness of said part and the head of the pin, and on which bends said sections are to be folded to constitute a closed box-band transversely encompassing said part and enclosing the head of the pin.

5. A pin or bolt retaining device of the character described for brake levers and the like comprising two parts having holes in register and a headed pin inserted through said holes for connecting said parts in free face-to-face relation, said retaining device being an integral strip of sheet metal and comprising a base section having a hole to register with the aforesaid holes and receive said pin, said section being of a length to match against and extend transversely across the inner face of one of said parts and to lie between said parts, and sections extending from the ends of said base section adapted to be folded into closed box-form transversely around said one part and the head on said pin, the ends of said strip having interengaging means for maintaining said box formation.

6. A pin or bolt retaining device of the character described for brake levers and the like comprising two parts having holes in register and a headed pin inserted through said holes for connecting said parts in free face-to-face relation, said retaining device being an integral strip of sheet metal and comprising a base section having a hole to register with the aforesaid holes and receive said pin, said section being of a length to match against and extend transversely across the inner face of one of said parts and to lie between said parts, and sections extending from the ends of said base section adapted to be folded into closed box-form transversely around said one part and the head on said pin, the ends of said strip having interengaging means for maintaining said box formation, and said strip having transverse bend lines defining said sections and facilitating the correct folding of the same into said closed box form.

7. In a brake-beam having a strut, a brake-lever extending between the sides of said strut and a headed pin extending through holes in said sides and lever, in combination, a sheet metal retaining device for said pin comprising a base section interposed between said lever and one side member of the strut and having a hole through which said pin passes, said section lying transversely of said strut side, and sections extending from the ends of said base section adapted to be folded transversely of said strut side over the head of said pin and with said base section form a box-like frame enclosing a transverse portion of the strut side and said head, the ends of the device having interengaging parts for securing them together.

8. In a brake-beam having a strut, a brake-lever extending between the sides of said strut and a headed pin extending through holes in said sides and lever, in combination, a sheet metal retaining device for said pin comprising a base section interposed between said lever and one side member of the strut and having a hole through which said pin passes, said section lying transversely of said strut side, and sections extending from the ends of said base section adapted to be folded transversely of said strut side over the head of said pin and with said base section form a box-like frame enclosing a transverse portion of the strut side and said head, the ends of the device having interlocking hooks to be flattened against the head of the pin for locking the device in position.

9. A pin or bolt retaining device of the character described for brake levers and the like comprising two parts having holes in register and a headed pin inserted through said holes for connecting said parts in free face-to-face relation, in combination, said retaining device for said pin being of sheet metal and comprising a middle or base section interposed between said parts and having a hole through which said pin passes, end sections extending outwardly from said base section and outer sections extending from said end sections and adapted to be folded toward each other at the outer face of the head of the pin, said device forming a box-like band enclosing one of said parts and the head of the pin.

10. A pin or bolt retaining device of the character described for brake levers and the like comprising two parts having holes in register and a headed pin inserted through said holes for connecting said parts in free face-to-face relation, in combination, said retaining device for said pin being of sheet metal and comprising a middle or base section interposed between said parts and having a hole through which said pin passes, end sections extending outwardly from said base section and outer sections extending from said end sections and adapted to be folded toward each other at the outer face of the head of the pin, said device forming a box-like band enclosing one of said parts and the head of the pin, and said device being a sheet metal strip having transverse bend lines defining said sections and facilitating the correct folding of the strip into box-like form.

Signed at New York city, in the county of New York and State of New York, this 3rd day of July, A. D. 1924.

SETH A. CRONE.